(12) United States Patent
Kawada (10) Patent No.: US 8,496,767 B2
(45) Date of Patent: Jul. 30, 2013

(54) ANODIC BONDING METHOD, ANODIC BONDING JIG AND ANODIC BONDING APPARATUS

(75) Inventor: Yasuo Kawada, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 13/204,376

(22) Filed: Aug. 5, 2011

(65) Prior Publication Data

US 2011/0284148 A1   Nov. 24, 2011

Related U.S. Application Data

(63) Continuation of application No. PCT/JP2009/053339, filed on Feb. 25, 2009.

(51) Int. Cl.
 *B32B 37/00* (2006.01)
 *B29C 65/00* (2006.01)

(52) U.S. Cl.
 USPC ........... 156/64; 156/273.9; 156/308.2; 65/36; 65/59.1

(58) Field of Classification Search
 USPC ........... 156/1, 64, 272.2, 273.9, 274.4, 308.2, 156/378, 379, 379.6, 379.7, 380.2, 380.3, 156/580, 60, 99, 309.6, 379.8; 438/455, 456; 65/36, 59.1, 43, 152, 154, 406, 408
 See application file for complete search history.

(56) References Cited

U.S. PATENT DOCUMENTS

| 3,417,459 A * | 12/1968 | Pomerantz et al. ........ 156/273.1 |
| 2003/0168145 A1* | 9/2003 | Suga et al. ........................ 156/60 |

(Continued)

FOREIGN PATENT DOCUMENTS

| JP | 07-154183 A | 6/1995 |
| JP | 2001-174835 A | 6/2001 |

(Continued)

OTHER PUBLICATIONS

Machine translation of JP 07-154183A date unknown.*

(Continued)

*Primary Examiner* — John Goff
(74) *Attorney, Agent, or Firm* — Brinks Hofer Gilson & Lione (57) ABSTRACT

An anodic bonding method for anodically bonding a first substrate and a second substrate includes: a substrate placement step in which the first substrate and the second substrate are stacked and placed on a flat surface of a base with a surface of one of the first substrate and the second substrate to be cathode in contact with the flat surface of the base; a jig placement step, following the substrate placement step, in which the anodic bonding jig is placed so as to be in contact with a surface of one of the first substrate and the second substrate to be anode, the anodic bonding jig having a visual checking area formed of a material that allows visible light to pass through; an alignment step in which the relative positional relation between the first substrate and the second substrate is adjusted based on visible light passing through the visual checking area so that pairs of marks provided on the first substrate and the second substrate will be in a predetermined positional relation; a pressurizing step in which the base and the anodic bonding jig are pressurized in the direction to move the base and the anodic bonding jig close to each other, and the first substrate and the second substrate are sandwiched; and an application step in which a DC voltage is applied between the first substrate and the second substrate.

5 Claims, 6 Drawing Sheets

U.S. PATENT DOCUMENTS

2003/0205333 A1* 11/2003 Hayafuji et al. .............. 156/580
2007/0111471 A1 5/2007 Okada
2008/0210383 A1* 9/2008 Hirata ........................... 156/498

FOREIGN PATENT DOCUMENTS

| JP | 2002-265237 A | 9/2002 |
| JP | 2003-034559 A | 2/2003 |
| JP | 2006-248895 A | 9/2006 |
| JP | 2008-007348 A | 1/2008 |

OTHER PUBLICATIONS

International Search Report for International Application No. PCT/JP2009/053339, dated Jun. 2, 2009, 2 pages.

* cited by examiner

ANODIC BONDING METHOD, ANODIC BONDING JIG AND ANODIC BONDING APPARATUS

RELATED APPLICATIONS

This application is a continuation of PCT/JP2009/053339 filed on Feb. 25, 2009. The entire content of this application is incorporated herein by reference.

BACKGROUND OF THE INVENTION

1. Field of the Invention

The present invention relates to an anodic bonding method, an anodic bonding jig and an anodic bonding apparatus.

2. Description of the Related Art

Conventionally, in manufacturing a sensor, a piezoelectric vibrator or the like, a known package product includes a package in which a cavity is formed between a plurality of substrates bonded to each other.

For a package in such a package product and a method for manufacturing the package, Patent Document 1 describes a package manufactured by stacking and bonding substrates, for example. According to the package described in Patent Document 1, a space within the package can be airtightly sealed.

Also, Patent Document 1 discloses an anodic bonding method as a method of bonding substrates, in which a metal or semiconductor, such as aluminum, titanium, tantalum and silicon, can be used as a bonding layer.

In this case, when substrates to be anodically bonded as above are aligned with each other and placed on a base, and then an anodic bonding jig is placed, the substrates may become misaligned with each other.

For a conventional anodic bonding jig, the alignment is performed based on alignment marks on the substrates. However, during the time from when the substrates are accurately stacked based on the alignment marks till when pressurizing is started, the alignment marks are hidden, so there is no way to detect the above-described misalignment, then anodic bonding is performed while the misalignment remains. So, when a misalignment exceeding the tolerance occurs, all products formed on those substrates may be defective.

In order to address such a problem, an anodic bonding jig having a hole formed so as to pass through the jig from front side to back side has been proposed. For example, according to the proposal, the positions of the alignment marks can be recognized through the hole provided in the anodic bonding jig, which allows correction of a misalignment occurring in the substrates to be anodically bonded even after the anodic bonding jig is placed.

Patent Document 1: Japanese Patent No. 3621435

However, even for the conventional anodic bonding jig having the hole to align the positions of the alignment marks as above, since uniform pressure needs to be applied to the substrates, there is a limit to the size of the hole, which raises a problem of requiring a large amount of time and effort to align the alignment marks with the hole.

SUMMARY OF THE INVENTION

In view of the above problem, it is a first object of the present invention to provide an anodic bonding method for easily correcting a misalignment between substrates occurring in a process of anodic bonding.

Also, it is a second object of the invention to provide an anodic bonding jig and an anodic bonding apparatus for facilitating alignment of substrates to be anodically bonded.

In order to solve the above problem, the invention proposes the following means.

The anodic bonding method of the invention is an anodic bonding method for anodically bonding a first substrate and a second substrate, characterized by including: a substrate placement step in which the first substrate and the second substrate are stacked and placed on a flat surface of a base with a surface of one of the first substrate and the second substrate to be cathode in contact with the flat surface of the base; a jig placement step, following the substrate placement step, in which the anodic bonding jig is placed so as to be in contact with a surface of one of the first substrate and the second substrate to be anode, the anodic bonding jig having a visual checking area formed of a material that allows visible light to pass through; an alignment step in which the relative positional relation between the first substrate and the second substrate is adjusted based on visible light passing through the visual checking area so that pairs of marks provided on the first substrate and the second substrate will be in a predetermined positional relation; a pressurizing step in which the base and the anodic bonding jig are pressurized in the direction to move the base and the anodic bonding jig close to each other, and the first substrate and the second substrate are sandwiched; and an application step in which a DC voltage is applied between the first substrate and the second substrate.

According to the invention, a user can recognize the pairs of marks using the visual checking area of the anodic bonding jig through the material that allows visible light to pass through. Thus, in the alignment step, the first substrate and the second substrate can be aligned with each other so that the pairs of marks will be in a predetermined positional relation, based on visible light passing through the visual checking area. Furthermore, in the pressurizing step, a predetermined pressure can be applied to the first substrate and the second substrate, also in the visual checking area, which can suppress ununiformity of pressurizing.

Also, in the anodic bonding method of the invention, the alignment step preferably includes: a coarse adjustment step in which the positions of the first substrate and the second substrate are adjusted with respect to the base so that the pairs of marks will be superimposed on the visual checking area in the thickness direction of the visual checking area; and a fine adjustment step, following the coarse adjustment step, in which the relative positions of the first substrate and the second substrate are adjusted so that the pairs of marks will be in a predetermined positional relation.

In the coarse adjustment step, the pairs of marks are placed in an area recognizable through the visual checking area, then the relative positions of the pairs of marks are brought into a predetermined positional relation. Thus, a misalignment between the first substrate and the second substrate occurring in the jig placement step can be easily corrected in the alignment step.

The anodic bonding jig of the invention is an anodic bonding jig used for anodically bonding a first substrate and a second substrate, characterized by including: a main body having a first surface and a second surface; a smooth surface provided on at least a portion of the first surface and the second surface and capable of being in intimate contact with a surface of one of the first substrate and the second substrate to be anode; and a visual checking area provided in at least a portion of the smooth surface and formed of a material that allows visible light to pass through between the first surface and the second surface.

According to the invention, the smooth surface of the anodic bonding jig is brought into contact with the substrate to be anode in anodic bonding. Also, since the visual checking area is provided in a portion of the smooth surface, the positional relation between the first substrate and the second substrate can be recognized based on visible light passing through the visual checking area. Thus, the first substrate and the second substrate can be easily positioned, and a force applied to the first substrate and the second substrate through the anodic bonding jig is uniformly dispersed.

Also, in the anodic bonding jig of the invention, the smooth surface is preferably provided on each of the first surface and the second surface.

In this case, since the both surfaces of the anodic bonding jig are smooth, the both surfaces can be used to be brought into contact with the surface to be anode.

Also, in the anodic bonding jig of the invention, the main body is preferably formed in one piece of hard glass.

In this case, since the entire anodic bonding jig is formed in one piece of hard glass, the visual checking area and the remaining area are formed of a uniform material. Thus, when heating and pressurizing are performed through anodic bonding, stress is suppressed from concentrating on a specific point. Furthermore, the entire anodic bonding jig can be a visual checking area that allows visible light to pass through. This further facilitates positioning of the first substrate and the second substrate.

Also, in the anodic bonding jig of the invention, the main body is preferably formed in one piece of silica glass.

In this case, since silica glass is used, high transparency is ensured, and, the anodic bonding jig is resistant to softening also when the anodic bonding jig is heated through anodic bonding.

Also, in the anodic bonding jig of the invention, the main body preferably has a notch in an area including at least a portion of the smooth surface.

In this case, since an electrical contact can be connected to the anode exposed through the notch, anodic bonding is facilitated.

The anodic bonding apparatus of the invention is an anodic bonding apparatus for anodically bonding a first substrate and a second substrate, characterized by including: the anodic bonding jig of the invention; a base having a flat surface on which a surface of one of the first substrate and the second substrate to be cathode is to be placed; a power supply electrically connected to the first substrate and the second substrate for applying a DC voltage between the first substrate and the second substrate; and a pressurizer for pressurizing the base and the anodic bonding jig in the direction to move the base and the anodic bonding jig close to each other.

According to the invention, the positions of the first substrate and the second substrate can be easily adjusted through the visual checking area, and anodic bonding is performed with the first substrate and the second substrate accurately positioned, which can improve the accuracy of anodic bonding.

According to the anodic bonding method, the anodic bonding jig and the anodic bonding apparatus of the invention, since the visual checking area formed of a material that allows visible light to pass through is provided, a misalignment between the substrates occurring in a process of anodic bonding can be easily corrected.

Also, according to the anodic bonding apparatus of the invention, since a misalignment occurring in a process of anodic bonding is reduced, which improves the accuracy of anodic bonding, improving yield of anodically bonded products.

DETAILED DESCRIPTION OF THE PREFERRED EMBODIMENTS

An anodic bonding jig, an anodic bonding apparatus and an anodic bonding method in accordance with an embodiment of the invention are described below with reference to FIGS. 1 to 9.

Figure 1:
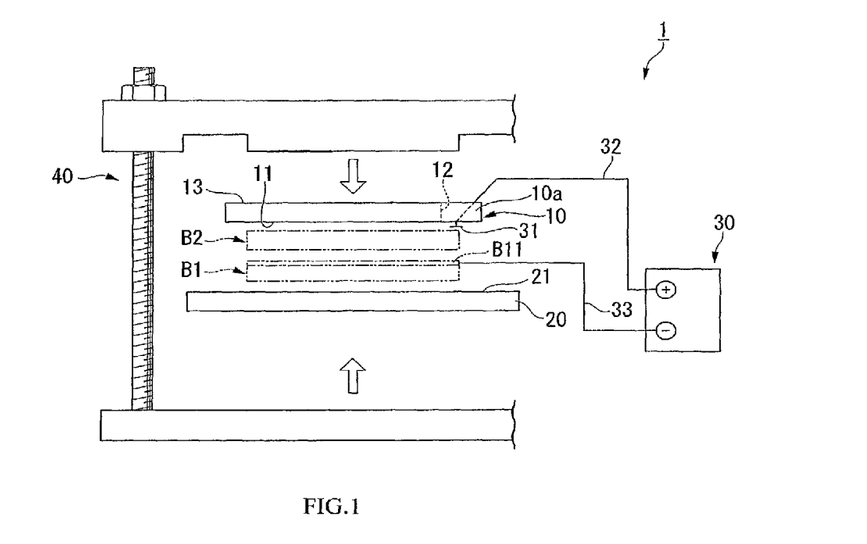
FIG. 1 is a side view schematically showing an anodic bonding jig and an anodic bonding apparatus in accordance with an embodiment of the invention.

FIG. 1 is a side view schematically showing the anodic bonding apparatus of the embodiment. As shown in FIG. 1, an anodic bonding apparatus 1 is an apparatus for anodically bonding a first substrate B1 and a second substrate B2. In the embodiment, both the first substrate B1 and the second substrate B2 are a glass substrate, and the first substrate B1 and the second substrate B2 are separated by a bonding film B11 of a metallic material. The bonding film B11 is a thin film of, for example, aluminum or the like, and is placed on the surface of the first substrate B1 opposite to the second substrate B2.

Also, in the embodiment, the anodic bonding apparatus 1 anodically bonds the bonding film B11 to the second substrate B2. Here, the first substrate B1 is a cathode substrate, and the second substrate B2 is an anode substrate.

The anodic bonding apparatus 1 includes: a base 20 having a flat surface 21 that can be in contact with the first substrate B1 to be cathode; an anodic bonding jig 10 that can be in contact with the second substrate B2 to be anode; a power supply 30 electrically connected to the first substrate B1 and the second substrate B2 for applying a DC voltage between the first substrate B1 and the second substrate B2; and a pressurizer 40 for pressurizing the base 20 and the anodic bonding jig 10 in the direction to move the base 20 and the anodic bonding jig 10 close to each other (the direction indicated by an arrow in FIG. 1).

The base 20 only needs to have the flat surface 21 and may be formed of any appropriate material and in any appropriate shape.

In the embodiment, the power supply 30 has a wire 33 connected to the bonding film B11 on the first substrate B1 and a wire 32 connected to a portion of the second substrate B2.

Although not shown, the anodic bonding jig 10 and the base 20 can support the first substrate B1 and the second substrate B2 by sandwiching the first substrate B1 and the second substrate B2.

Note that, in this embodiment, the pressurizer 40 has a configuration in which clamping is performed by moving two parts of the pressurizer 40 close to each other using a nut and a bolt, however, this is only an example, and any other configuration that can pressurize in the thickness direction between the anodic bonding jig 10 and the base 20 may be used.

The anodic bonding jig 10 has a main body 10a having a first surface 11 and a second surface 13. The first surface 11 is a smooth surface that can be in intimate contact with the second substrate B2 to be an anode. Note that, although, the smooth surface is spread all over the first surface 11 in this embodiment, the smooth surface only needs to be at least a portion of the first surface 11 that can be in intimate contact with the second substrate B2. Also, the anodic bonding jig 10 is formed of a hard glass and allows visible light to pass through between the first surface 11 and the second surface 13. Furthermore, desirably, the anodic bonding jig 10 is uniformly formed in one piece of a plate-shaped hard glass having a constant thickness. This is to facilitate manufacturing of the anodic bonding jig 10 and to suppress production of an interface at which materials having a different composition border on each other, thereby avoiding concentration of stress and fracture when the anodic bonding jig 10 is pressurized.

Note that the anodic bonding jig 10 is desirably formed of silica glass.

Also, an area of the anodic bonding jig 10 that allows visible light to pass through in the thickness direction acts as a visual checking area for visually checking positions of the first substrate B1 and the second substrate B2 for relative position adjustment. In the embodiment, the entire surface of the anodic bonding jig 10 allows visible light to pass through and the entire anodic bonding jig 10 acts as the visual checking area. Note that the anodic bonding jig 10 may include a portion that does not allow visible light to pass through.

Figure 2:
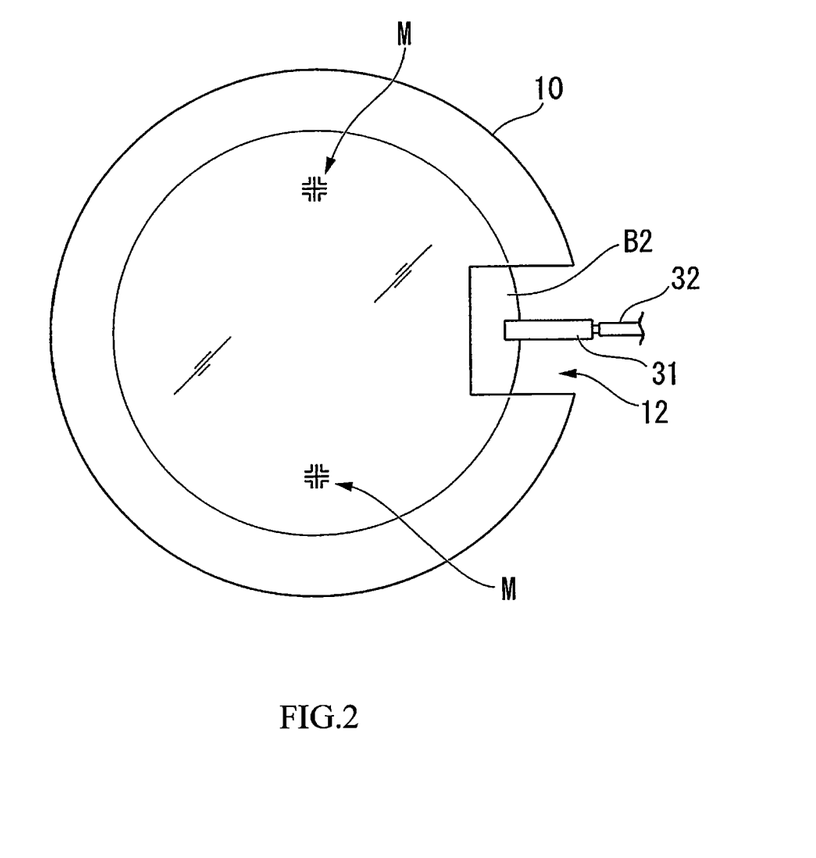
FIG. 2 is a plan view showing a configuration of a portion of the anodic bonding jig and the anodic bonding apparatus.

FIG. 2 is a plan view showing a configuration of a portion of the anodic bonding apparatus 1 and the anodic bonding jig 10. As shown in FIG. 2, in the anodic bonding apparatus 1, a notch 12 is formed in the anodic bonding jig 10, through which a portion of the second substrate B2 placed in the anodic bonding apparatus 1 is exposed. The notch 12 is formed in a portion of the circumferential edge of the anodic bonding jig 10, in which a contact electrode 31 connected to the wire 32 is provided. The contact electrode 31 can be attached to and detached from the second substrate B2.

Furthermore, according to the plan view shown in FIG. 2, positions of pairs of alignment marks (hereinafter referred to as "marks M") provided on the first substrate B1 and the second substrate B2 to align the first substrate B1 and the second substrate B2 with each other can be recognized through the visual checking area of the anodic bonding jig 10.

Figure 3:
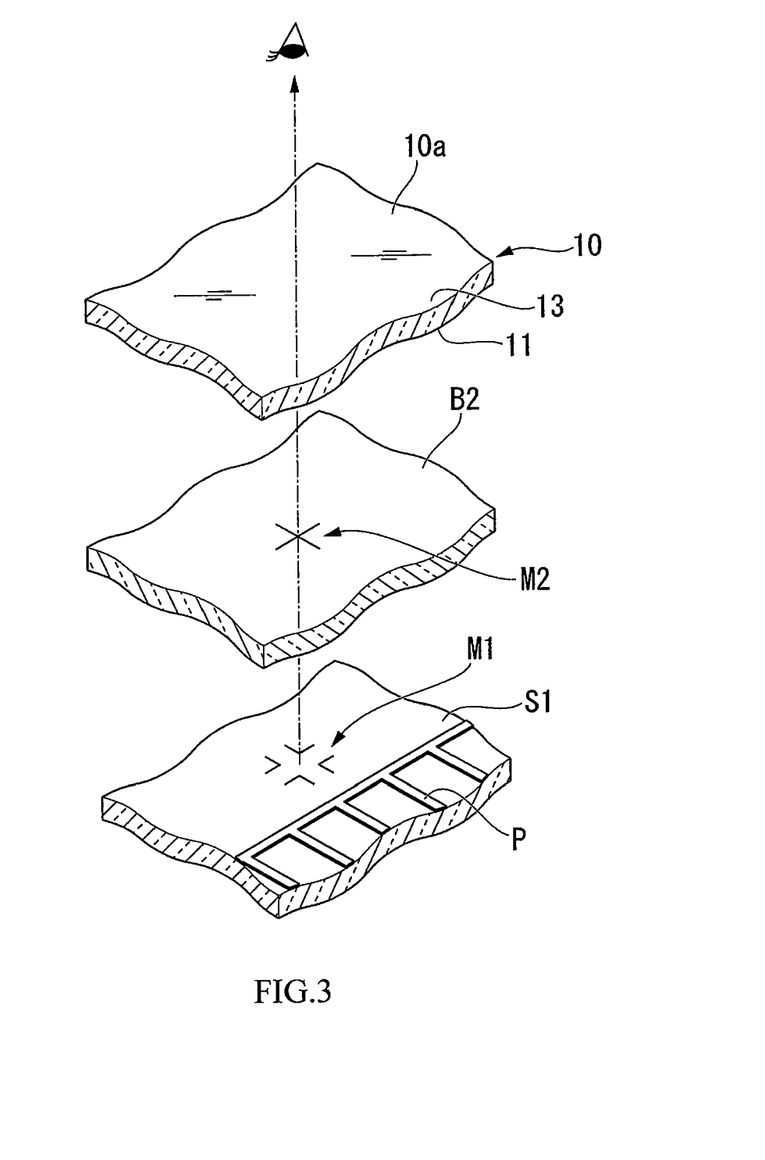
FIG. 3 is a perspective view for explaining an operation of the anodic bonding jig and the anodic bonding apparatus.

FIG. 3 is a perspective view showing the operation of the marks M and the anodic bonding jig 10. As shown in FIG. 3, the marks M include first marks M1 provided on the first substrate B1 and second marks M2 provided on the second substrate B2. The second substrate B2 allows visible light to pass through because of a glass substrate, and in addition, the anodic bonding jig 10 allows visible light to pass through between the first surface 11 and the second surface 13. Thus, a user can recognize through the anodic bonding jig 10 how the first marks M1 and the second marks M2 are superimposed on each other. Note that, on the first substrate B1, the first marks M1 are placed avoiding a pattern P of the bonding film B11.

Figure 4:
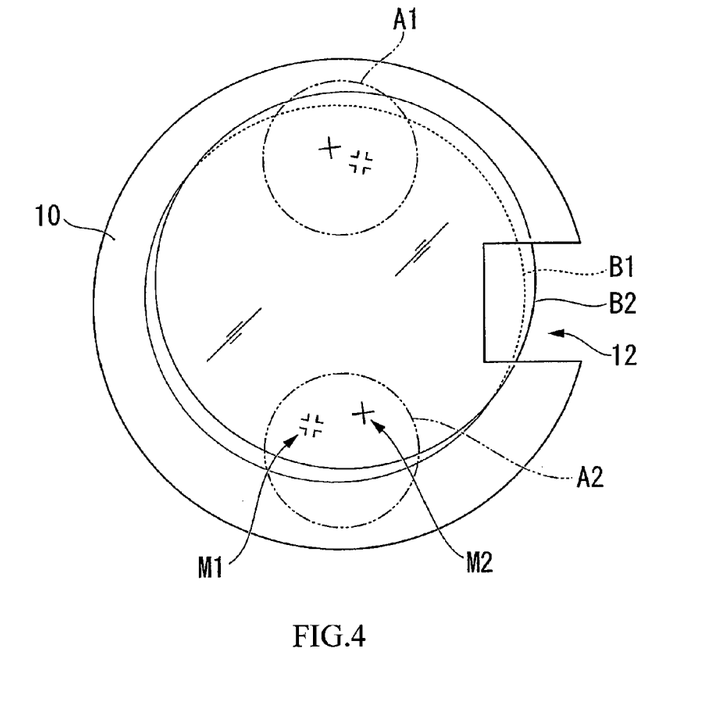
FIG. 4 is a plan view showing a process in which the anodic bonding jig and the anodic bonding apparatus are used.
Figure 5:
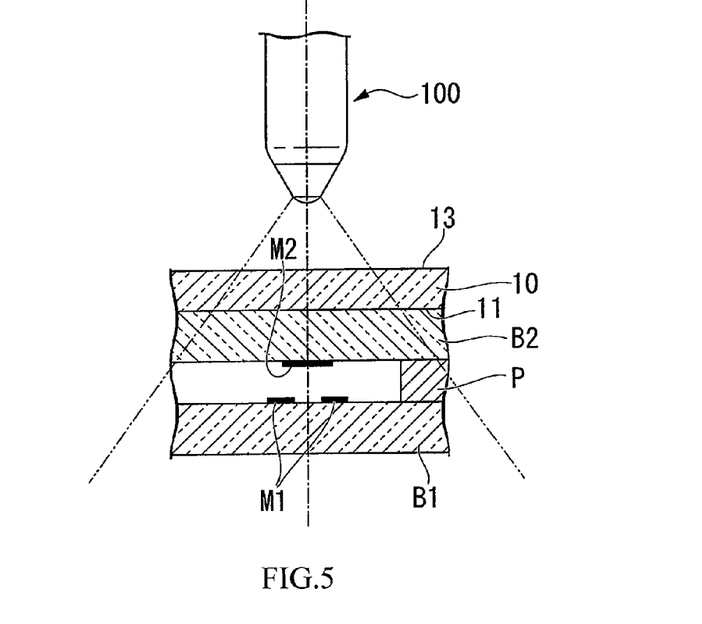
FIG. 5 is a side view showing, by partial cross-section, a process in which the anodic bonding jig and the anodic bonding apparatus are used.
Figure 6:
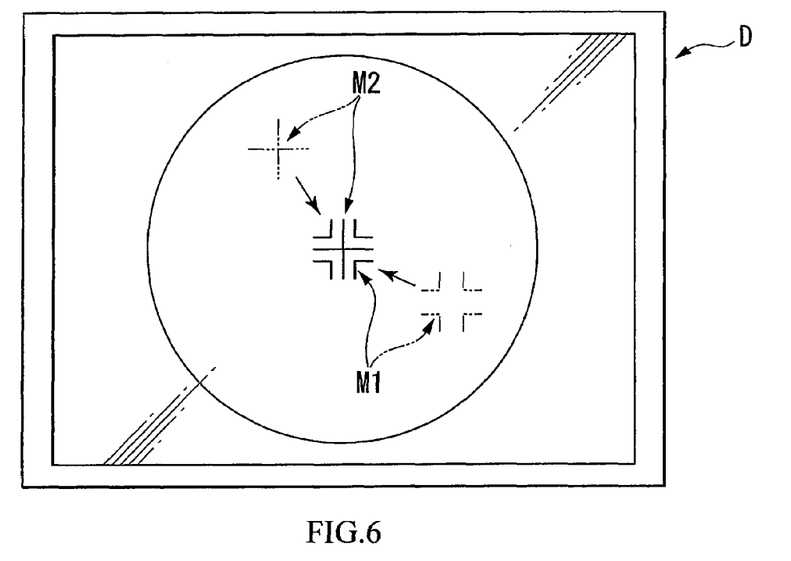
FIG. 6 shows a process in which the anodic bonding jig and the anodic bonding apparatus are used.
Figure 7:
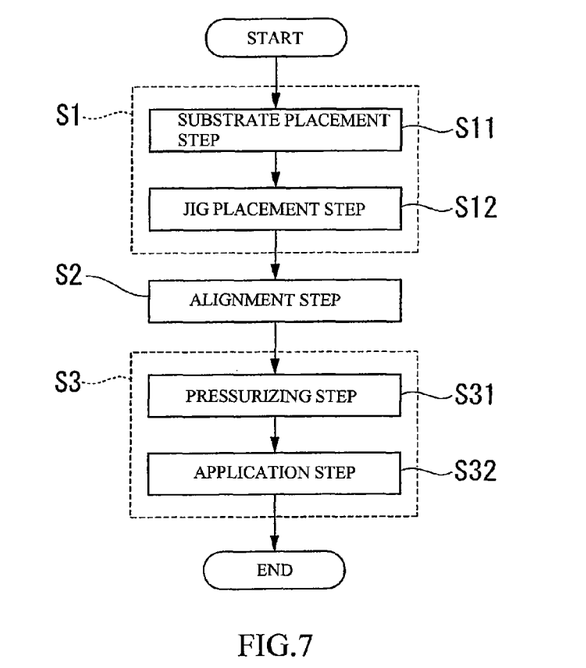
FIG. 7 is a flowchart showing an anodic bonding method in accordance with an embodiment of the invention.
Figure 8:
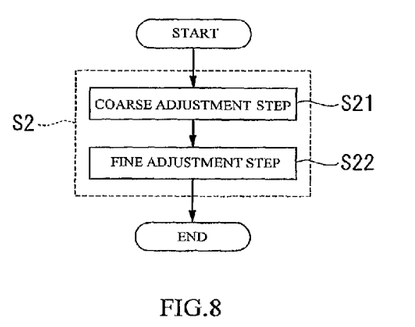
FIG. 8 is a flowchart showing some steps of the anodic bonding method in detail.

Operation in use of the anodic bonding apparatus 1 and the anodic bonding jig 10 of the embodiment, the configuration of which has been described above, and the anodic bonding method of the invention are described with reference to FIGS. 4 to 8. FIGS. 4 to 6 show a process in which the anodic bonding jig 10 and the anodic bonding apparatus 1 are used. FIGS. 7 and 8 are flowcharts showing the anodic bonding method. Now, the steps of anodic bonding in accordance with the embodiment are described according to the flowcharts shown in FIGS. 7 and 8.

As shown in FIG. 7, in the embodiment, first, a sandwiching step S1 for sandwiching the first substrate B1 and the second substrate B2 between the anodic bonding jig 10 and the base 20 is performed. The sandwiching step S1 includes: a substrate placement step S11 in which the first substrate B1 and the second substrate B2 are stacked and placed on the flat surface 21 of the base 20 with the surface of the first substrate B1 to be cathode in contact with the flat surface 21; and a jig placement step S12, following the substrate placement step S11, in which the anodic bonding jig 10 is placed so as to be in contact with the surface of the second substrate B2 to be anode of the first substrate B1 and the second substrate B2.

FIG. 4 is a plan view schematically showing the positional relation among the anodic bonding jig 10, the first substrate B1 and the second substrate B2 in the sandwiching step S1. Note that, in FIG. 4, the positional relation is shown exaggeratingly for clarification. As shown in FIG. 4, in the sandwiching step S1, it is allowed that the first substrate B1 and the second substrate B2 are not completely stacked and the first marks M1 and the second marks M2 shown in FIG. 4 are misaligned in plan view.

Reference numbers A1 and A2 in FIG. 4 indicate areas to be used for aligning the marks M in the visual checking area of the anodic bonding jig 10 of the embodiment (hereinafter referred to as "area A1" and "area A2"). In the sandwiching step S1, the marks M only need to be positioned within the areas A1 and A2, and precise alignment is not required.

Next, as shown in FIG. 7, an alignment step S2 is performed, following the sandwiching step S1, in which the relative positional relation between the first substrate B1 and the second substrate B2 is adjusted based on visible light passing through the areas A1 and A2 of the visual checking area so that the marks M1 and M2 provided on the first substrate B1 and the second substrate B2 will be in a predetermined positional relation.

As shown in FIG. 8, the alignment step S2 includes a coarse adjustment step S21 and a fine adjustment step S22.

In the coarse adjustment step S21, the positions of the first substrate B1 and the second substrate B2 are adjusted with respect to the base 20 to the extent that the marks M are superimposed on the areas A1 and A2 of the visual checking area in the thickness direction, and that the marks M are almost aligned according to a predetermined positional relation within the areas A1 and A2. This may be performed by, for example, aligning the first substrate B1 and the second substrate B2 by visual check with respect to circuit patterns or the like (e.g., the pattern P of the bonding film B11 or the like) formed on the first substrate B1 and the second substrate B2.

In the fine adjustment step S22, as shown in FIGS. 5 and 6, the positions of the first substrate B1 and the second substrate B2 are adjusted so that the first marks M1 and the second marks M2 will be in the predetermined positional relation, using a microscope apparatus including a microscope 100 and a monitor D.

Once the alignment step S2 is completed, the anodic bonding jig 10 and the base 20 are temporarily fixed to secure the first substrate B1 and the second substrate B2. Next, a bonding step S3 for anodically bonding the first substrate B1 and the second substrate B2 is performed.

In the bonding step S3, first, the anodic bonding jig 10, first substrate B1, second substrate B2 and base 20 in the positional relation shown in FIG. 1 are set in the pressurizer 40, and then the pressurizing step S31 is performed. Next, the wire 33 is connected to the bonding film B11 on the first substrate B1, then the contact electrode 31 is connected to the second substrate B2, and then a DC voltage is applied by the power supply 30. Then, the bonding film B11 on the first substrate B1 to be cathode and the second substrate B2 to be anode are anodically bonded.

As described above, according to the anodic bonding jig 10 and the anodic bonding method of the embodiment, in anodic bonding, the smooth surface on the first surface 11 of the anodic bonding jig 10 is brought into contact with the second substrate B2 to be anode, and the positional relation between the first substrate B1 and the second substrate B2 can be easily recognized through the anodic bonding jig 10 that allows visible light to pass through.

Also, the visual checking area for visually checking the marks M is provided in a portion of the smooth surface (the first surface 11) having no hole therein. So, when the anodic bonding jig 10 is pressurized in the pressurizing step S31, a force applied to the first and second substrates is uniformly dispersed. Furthermore, the anodic bonding jig 10 is formed in one piece of hard glass, which provides high permeability of visible light and high strength. Thus, also, when pressurized in the pressurizing step S31, a fracture of the anodic bonding jig is suppressed.

Furthermore, according to the anodic bonding method of the embodiment, in the alignment step S2, the first substrate B1 and the second substrate B2 can be easily aligned with each other so that the pairs of marks M will be in a predetermined positional relation, based on visible light passing through the visual checking area (e.g., areas A1 and A2).

A variation of the anodic bonding apparatus 1 of the embodiment is described below with reference to FIG. 9.

Figure 9:
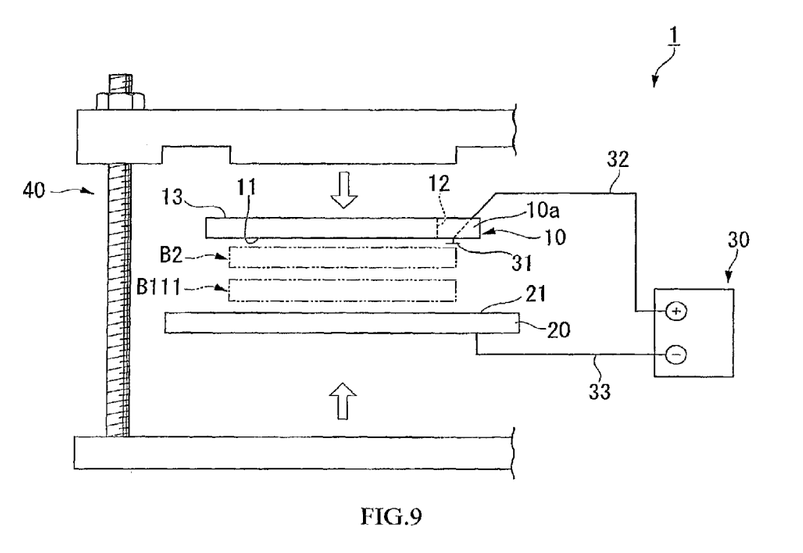
FIG. 9 is a side view showing a variation of the anodic bonding apparatus shown in FIG. 1.

FIG. 9 is a side view schematically showing the anodic bonding apparatus of the variation. For the variation, a case of using a first substrate B111 in place of the first substrate B1 as shown in FIG. 9 is described.

The first substrate B111 is, for example, a metallic substrate containing silicon or the like, and is a type of substrate that does not require a bonding film for anodic bonding. In this case, the base 20 can be formed of an electrically conductive material, and the wire 33 can be connected to the base 20.

Although the embodiment of the invention has been described with reference to the drawings, a specific configuration is not limited to this embodiment, but any design change can be made without departing from the spirit of the invention.

For example, in the embodiment, the smooth surface is provided on the first surface 11 of the main body 10a. However, not being limited to this, the smooth surface may also be provided on the second surface 13. This allows any of the first surface 11 and the second surface 13 to be brought into intimate contact with the substrate to be anode, eliminating the need for paying attention to the orientation of the main body 10a to improve the workability.

The invention can be suitably applied to a case in which, when a plurality of substrates are aligned and then sandwiched, a misalignment of the sandwiched substrates needs to be corrected.

What is claimed is:

1. An anodic bonding method for anodically bonding a first substrate and a second substrate, the method comprising:
    a substrate placement step in which the first substrate and the second substrate are stacked and placed on a flat surface of a base with a surface of the first substrate in contact with the flat surface of the base, the second substrate comprising an optically transparent material;
    a jig placement step, following the substrate placement step, in which an anodic bonding jig comprising a single piece of hard glass is placed in intimate contact with a surface of the second substrate, the anodic bonding jig having a visual checking area that allows visible light to pass through;
    an alignment step in which the relative positional relation between the first substrate and the second substrate is adjusted based on visible light passing through the visual checking area and the second substrate so that pairs of marks provided on the first substrate and the second substrate will be in a predetermined positional relation;
    a pressurizing step in which the base and the anodic bonding jig are pressurized to move the base and the anodic bonding jig close to each other, sandwiching the first substrate and the second substrate therebetween; and
    an application step in which a DC voltage is applied between the first substrate and the second substrate by applying a contact electrode to the second substrate through a notch in a perimeter portion of the anodic bonding jig.

2. The anodic bonding method according to claim 1, wherein the alignment step comprises: a coarse adjustment step comprising viewing the pairs of alignment marks from above the anodic bonding jig through the second substrate in which the positions of the first substrate and the second substrate are adjusted with respect to the base so that the pairs of marks will be superimposed on the visual checking area in the thickness direction of the visual checking area; and
    a fine adjustment step, following the coarse adjustment step, in which the relative positions of the first substrate and the second substrate are adjusted so that the pairs of marks will be in a predetermined positional relation.

3. The anodic bonding method according to claim 1, wherein the first substrate comprises a metallic substrate.

4. The anodic bonding method according to claim 3, wherein the second substrate comprises a glass substrate.

5. The anodic bonding method according to claim 1 further comprising forming a bonding film on one of the first or second substrates and contacting the bonding film with a wire.

* * * * *